Macon & Hunt,
Spinning Mule.

No. 105,705.   Patented July 26, 1870.

WITNESSES.                                    INVENTORS.

United States Patent Office.

HEZEKIAH MACON AND JOSHUA HUNT, OF PROVIDENCE, RHODE ISLAND.

Letters Patent No. 105,705, dated July 26, 1870.

IMPROVEMENT IN DEVICE FOR PREVENTING THE UNCOUPLING OF CLUTCHES IN SPINNING-MULES.

The Schedule referred to in these Letters Patent and making part of the same.

We, HEZEKIAH MACON and JOSHUA HUNT, of Providence, Rhode Island, have invented a Device for Preventing the Clutches on Mule - Heads from springing apart, of which the following is a specification.

In the accompanying drawing—

Figures 1, 2:
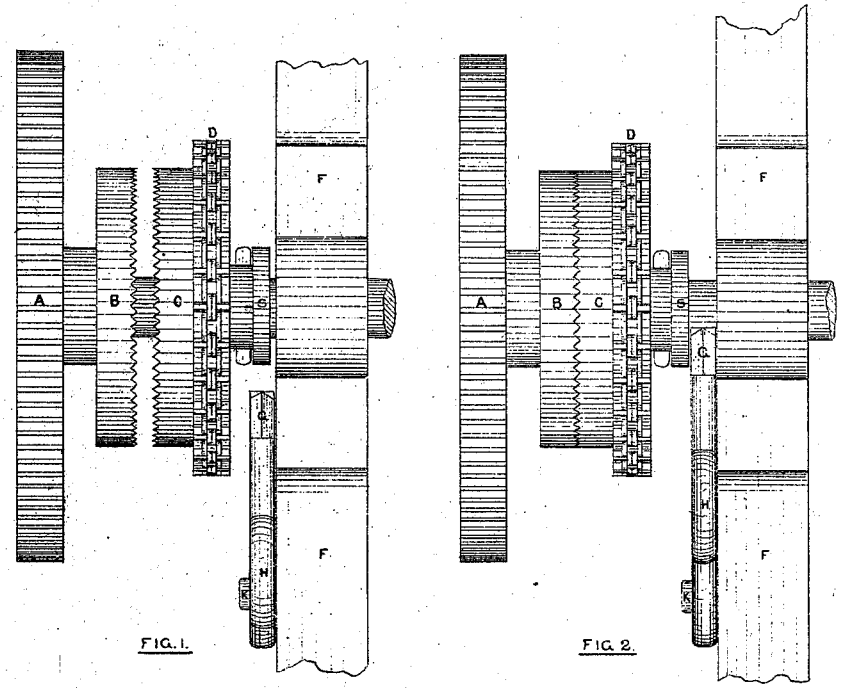

Figure 1 is a view of the clutches, lever, collar, and spindle in position when the carriage is returning to the mule-head.

Figure 2, view of the position of the clutches, lever, &c., when the carriage has started away from the mule-head.

Figure 3:
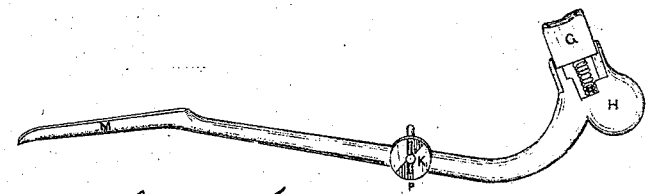

Figure 3, perspective view of lever, with the arm M, the fulcrum K, the pin P, the weight H, and the movable head G.

As the clutches B and C interlock to change the direction of the travel of the mule-carriage, it often happens that the force which throws them together reacts and throws them apart again, by which great damage is done by breaking of yarn. Some device has long been desired to prevent this happening, and the one herein described accomplishes the purpose, and operates as follows:

We make the lever M of wood, or of iron or other metal, either casting or attaching a weight, H, at one end, and a head, G, just above the weight. Between the head and weight we place a spiral spring, or a piece of rubber, of sufficient power to throw the head up and nearly out of the guides when relieved of resistance.

We fix a fulcrum-spindle at K, and through the spindle we place a little pin, P, which works within a groove cut in the lever, and governs its traverse so that it shall remain in a position to be acted upon by the carriage.

In fig. 1 the positions of the parts are shown when the carriage is coming toward the head. The device is attached to the upright F of the frame by the fulcrum-spindle K, and is held in position by the pin P.

The carriage strikes the arm M and pushes it down, thus raising the other end of the lever till the head G strikes the shoulder S of the sliding clutch, and bearing against this shoulder the head is pressed down within the guides, and toward the weight H.

The movable clutch C being carried toward, and interlocked with B, removes the shoulder S from the head G, which, by action of the spring, is thrown in behind the shoulder S, and against its shaft, thus filling the space and holding the clutch C in position, as shown in fig. 2, preventing a possibility of a springing apart.

The mule now travels away from the head, and as soon as it has passed the end of the lever M the weight H draws the head down and away from the shaft, so that, when the carriage has reached the terminus of its run, the clutch C moves away from the clutch B, and assumes again the position shown in fig. 1. The utility of our invention readily suggests itself, and the simplicity of its construction commends the device.

Claim.

What we claim as our invention, and desire to secure by Letters Patent, is—

The combination of the head G, the weight H, the pin P, and the lever M, all applied and operating as described, for preventing the clutches of mule-heads from springing apart.

HEZEKIAH MACON.
JOSHUA HUNT.

Witnesses:
J. ERASTUS LESTER,
FRANK G. ALLEN.